Nov. 6, 1956  D. J. ABRAMSON  2,769,441
SPECULUM
Filed Oct. 22, 1954
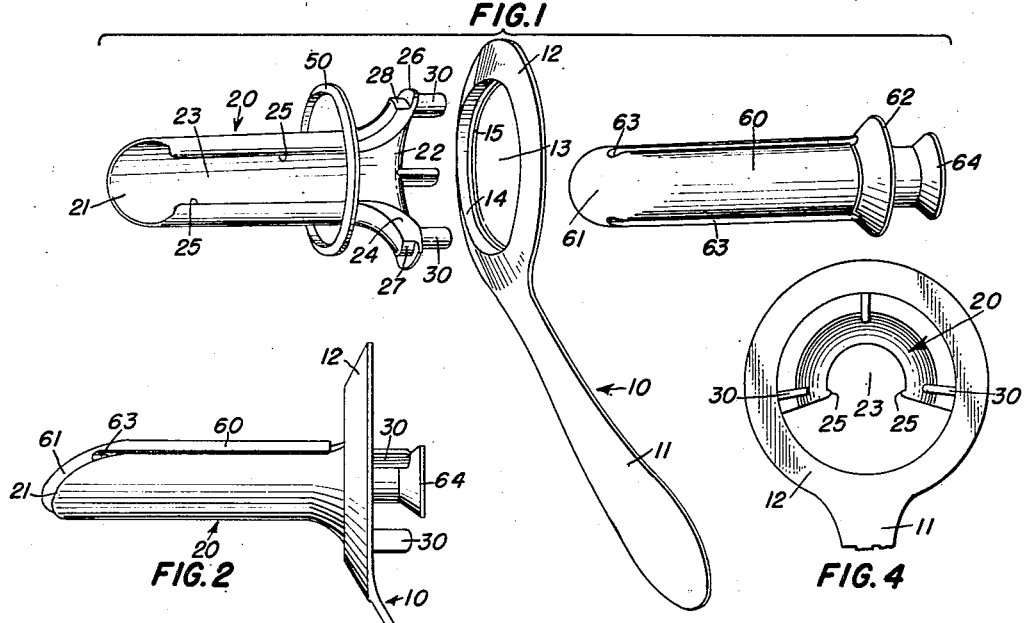
FIG.1
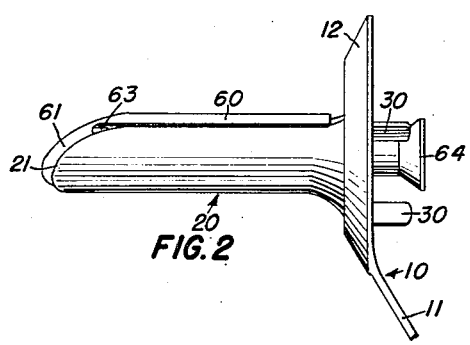
FIG.2
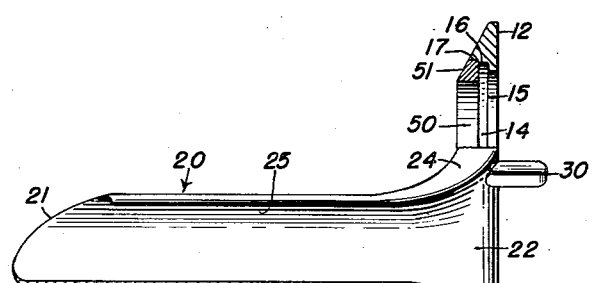
FIG.5
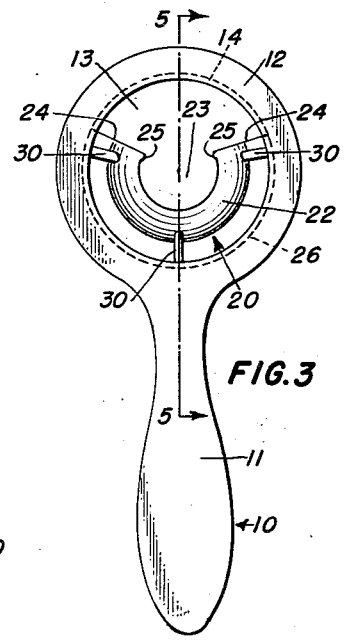
FIG.4
FIG.3
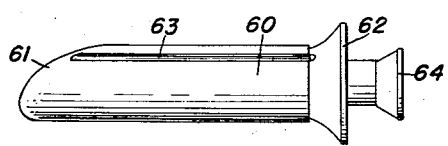
FIG.6
INVENTOR
DANIEL JEROME ABRAMSON
BY *Alexander Bishoff*
ATTORNEY

United States Patent Office 2,769,441
Patented Nov. 6, 1956

2,769,441

SPECULUM

Daniel Jerome Abramson, Bethesda, Md.

Application October 22, 1954, Serial No. 463,990

11 Claims. (Cl. 128—4)

My present invention relates generally to a surgical instrument used for observation of body cavities, and particularly to an improved anoscope for rectal examination, although the improved construction may be incorporated in any speculum such as a proctoscope, sigmoidoscope, laryngoscope, bronchoscope or urethroscope.

It is a principle object of the invention to provide a speculum having a handle to facilitate insertion into the body cavity, and so constructed as to permit holding the handle stationary while the viewing element is turned completely 360° to allow full observation of the cavity, thus obviating the need for frequent reinsertions.

It is a further object of the invention to provide a speculum of simple, inexpensive construction whose parts may be easily separated for thorough cleaning and sterilization.

Another object of the invention is to provide a speculum so constructed as to permit observation of a large internal area of the body cavity while at the same time exposing an external area adjacent the cavity to examination.

Still another object of the invention lies in the provision of a speculum having a viewing tube which may be rotated to permit examination of a body cavity without pinching, cutting or otherwise injuring the mucous membranes.

I achieve these objects and such other objectives and advantages as may hereinafter appear or be pointed out, in the manner shown in the appended drawings, which cover a preferred embodiment of the invention selected for illustrative purposes, and wherein:

Figure 1 is an exploded perspective view of an anoscope constructed in accordance with my invention and shown with the parts separated but in proper relation for assembly, Figure 2 is a side elevation of the anoscope with its parts completely assembled and ready for use, Figure 3 is an end view of the anoscope with the obturator removed, Figure 4 is a partial view similar to Figure 3 in which the viewing tube has been rotated 180°, Figure 5 is a sectional view of the instrument taken on line 5—5 of Figure 3 but to a larger scale, and Figure 6 is a side elevation of the obturator alone.

The anoscope illustrated herein comprises a handle 10, a tubular viewing element 20 rotatively supported on the handle, a retaining ring 50 for releasably attaching the viewing element to the handle, and an obturator 60. These elements may be formed of stainless steel, plated metals, plastics or other suitable materials.

The handle element is formed with an oval gripping portion 11 conveniently shaped to facilitate holding in the palm of one hand. Integrally formed at one end of the grip, is a ring shaped portion 12 which is offset from the plane of the grip. The ring portion surrounds an opening 13 whose wall is adapted to seat and rotatively carry the viewing element. For this purpose the wall is channeled at 14 to provide a flat bearing face 15 and a cylindrical face 16 at right angles to each other. The face 16 is preferably grooved slightly at 17 to more securely hold the retaining ring 50.

The viewing element 20 is of tubular shape and open at both ends. The wall of the tube is cut away at one end 21, to present a rounded tapering shape, and flared outwardly at the other end 22 for seating in the handle opening 13. A slot 23 extends the entire length of the tube wall so as to communicate with the open ends 21 and 22, thus providing a large continuous area of tube opening through which a body cavity may be observed. The slot is widened at 24 to effectively cut away a larger portion of the tube's flared end 22, and to increase the observation area so as to include within the field of view an area adjacent the anus but exterior thereof. To avoid pinching or cutting of mucous membranes during rotation of the viewing tube, the tube surfaces and edges should avoid sharpness. Accordingly, the edges of slot 23 and of the tube wall at ends 21 and 22 are rounded, rolled, beaded or otherwise softened. In the illustrated embodiment rolled edges are shown as referenced at 25.

There is provided at the flared end of the viewing tube, a semi-circular bearing flange 26 which seats against surfaces 15 and 16 of the instrument handle. On its opposite side, flange 26 and cylindrical surface 27 of smaller diameter form a channel or seat adapted to receive the tube retaining ring 50.

A number of projections 30 are formed near the periphery of the viewing tube and extend through the handle opening 13 upon assembly of the instrument. These projections may be engaged by the fingers of the user to rotate the tube in the handle opening.

The retaining ring 50 is fabricated of a resilient, springy metal or material. It is shaped slightly out of round and very slightly larger than the circular channel 14, so that it may be deformed by finger pressure to snap into the channel and frictionally hold the tube to the handle. To increase the amount of frictional pressure, the outer surface of ring 50 is made slight convex so as to seat in and fit the curvature of groove 17 in channel 14 as illustrated in Figure 5. The surfaces of the ring 50 which bear against flange 26 and seat 27 are respectively flat and cylindrical, while the remaining surface 51 is conically tapered to blend smoothly into the contour of the handle portion 12.

The frictional pressure, by means of which the viewing tube and handle are held together by the ring 50, is primarily exerted outwardly against the groove 17. The remaining ring faces, which contact flange 26 and surface 27, are smooth and polished so as to freely permit rotation of the tube and its flange, the latter turning in the channel formed between the ring and polished bearing faces 15 and 16. The frictional pressure exerted by the ring to hold the tube in the handle is not so great as to prevent their disassembly. Separation of these elements may be readily accomplished by grasping the tube in one hand, the handle in the other, and pulling them apart. Only sufficient force need be applied to overcome the frictional restraining force and dislodge the ring from channel 14.

The obturator 60 is of cylindrical shape and of a diameter slightly smaller than the internal diameter of the viewing tube so as to freely slide therein. One end of the obturator is tapered and rounded as referenced at 61. The other end is provided with a conical enlargement 62 which complements, and upon assembly, rests against and closes the flared end 22 of the viewing tube. A pair of longitudinal slots 63 are formed in the cylindrical body of the obturator of sufficient width and depth to slideably receive the rolled edges 25 of the viewing slot in tube 20. There is provided projecting knob 64 which may be grasped to insert the obturator into the viewing tube or to remove it therefrom.

In utilizing the instrument, all parts including the obturator are assembled in the manner described above to form a smooth tapering body depicted in Figure 2. The instrument held by the handle is inserted fully into the anus. Retaining the handle in one hand the knob 64 may be grasped with the other and the obturator removed from tube 20. Such removal permits visual examination of the internal anal area adjacent the distal end 21 of the viewing tube and along slot 23, as well as examination of the external anal area adjacent the proximal, cut away tube end 22. Still holding the handle stationary, the tube projections may be engaged by the fingers of the free hand to slowly rotate the viewing tube 360° in either direction, thereby successively exposing all parts of the anal area to view. Upon completion of the examination, the anoscope is withdrawn from the anus by exerting a pulling force on the handle. After removal, the instrument may be readily disassembled by grasping the tube and handle and pulling them apart with sufficient force to overcome the frictional holding action of the retaining ring 50. Separation in this manner allows thorough cleaning and sterilization of the individual parts, with access to all surface areas normally concealed or covered in the assembled instrument.

After cleaning, when it is desired to reassemble the instrument, the separated parts are arranged in the relationship portrayed in Figure 1. The viewing tube may then be inserted into the handle opening to seat flange 26 against face 15. The ring 50 may then be moved adjacent to its seat 27 on the tube and by finger pressure snapped into engagement with the retaining surface 17 of the handle. The obturator is then slid into the tube through the handle opening, and the instrument is again ready for use.

Provision of a handle which may be held stationary, while the viewing tube is rotated, eliminates a disadvantage of existing instruments which are turned by movement of their handles. In utilizing the latter, it is difficult to keep the instrument in place, particularly while examining an obese buttock. The viewing tube tends to cant in the anus with resultant pain to the patient, and frequently the instrument slips out, necessitating replacement of the obturator and reinsertion of the anoscope before the examination can be continued. The improved construction described herein obviates the necessity for such frequent, time consuming and painful reinsertions.

While I have described my invention as applied particularly to the construction of an anoscope, it is capable of use in the construction of specula of other types. It will also be understood that those skilled in the art may make modifications in the shape, material and details of the exemplified embodiment without necessarily departing from the scope and spirit of the appended claims.

Having thus described and illustrated my invention, what I claim as new and desire to secure by Letters Patent is:

1. A speculum comprising a handle having an opening therethrough, a channel in the wall surrounding said opening, a tubular member receivable in said opening provided with a flange rotatably seated in said channel, and a resilient ring pressed into said channel against said flange to releasably hold said tubular member in said handle opening.

2. A speculum comprising a tubular viewing element open at both ends, one end of said element being flared outwardly, a slot in the wall of said element extending from one end to the other, the edges of said slot being rounded inwardly to prevent damage to mucous membranes, a cylindrical obturator flared at one end and tapered at the other slideably receivable in said element to close off its ends, said obturator having channels parallel to its axis for receiving the rounded edges of the viewing element slot.

3. A speculum capable of being readily assembled and disassembled comprising, a handle having an opening, a viewing tube for rotative seating in said opening and a retaining member of spring material pressed into engagement with said handle and viewing tube to hold them assembled while permitting rotation of said viewing tube in the handle opening, said speculum being disassembled by exertion of a force adequate to overcome the pressure of said spring retaining member.

4. A speculum comprising a handle, a viewing element, and spring retaining means pressing said handle and viewing element together while permitting rotational engagement of said viewing element against the handle, said handle and viewing element being readily separated by application of a force sufficient to overcome the retaining pressure of said spring means.

5. A speculum comprising a handle having an opening, a tubular viewing member rotatively seated in said opening, and a deformable resilient ring pressed into said opening against said viewing member to releasably hold the handle and viewing member together while permitting rotation of the viewing member.

6. A speculum comprising a handle having an opening therethrough, a channel in the wall surrounding said opening, a portion of said channel having a grooved surface, a tubular viewing member having a flange rotatably seated in said channel, and a resilient retaining ring deformed and pressed into said channel against said flange to releasably hold the handle and viewing member together while permitting rotation of the viewing member, said ring having a curved face interfitting with said grooved surface portion of the channel whereby the frictional retaining force of said deformed ring is increased.

7. A speculum as set forth in claim 5 wherein said tubular viewing member is open at both ends and slotted throughout its length, the edges of said tubular member and slot being rounded to prevent injury to mucous membranes of a patient during use of the speculum.

8. A speculum as set forth in claim 5 wherein said tubular viewing member is outwardly flared at the end seated in said handle opening and is provided with a slot in its wall extending from end to end, which slot is widened at the outwardly flared end, whereby during use of the speculum a view of the area adjacent and external, as well as internal, to a body cavity is obtained.

9. A speculum as set forth in claim 5 wherein said tubular viewing member comprises at least one projecting element extending beyond said handle opening and graspable to turn said member in the handle opening.

10. A speculum as set forth in claim 5 wherein said tubular viewing member has a slot from end to end, and an obturator slideably receivable in said viewing member to close said ends and slot.

11. A speculum comprising a handle having an opening, a viewing tube journalled at one end in said handle opening for rotation therein, said tube being flared outwardly at its journalled end, a slot in said tube extending completely from one end to the other, the edges of said slot being rounded to prevent damage to mucous membranes, a cylindrical obturator flared at one end and tapered at the other slideably receivable in said viewing tube to close off its ends and removable therefrom through said handle opening.

References Cited in the file of this patent

UNITED STATES PATENTS

| 302,846   | Ingersoll   | July 29, 1884 |
| 312,123   | Ives        | Feb. 10, 1885 |
| 1,934,698 | Cameron     | Nov. 14, 1933 |
| 2,702,543 | Pugh et al. | Feb. 22, 1955 |

FOREIGN PATENTS

| 154,241 | Austria | Sept. 10, 1938 |

OTHER REFERENCES

Catalog of The Kny-Scheerer Corp., New York, New York, 22nd Edition, page 2187. Copy in Division 55.